United States Patent
Jansen et al.

(10) Patent No.: US 8,722,770 B2
(45) Date of Patent: May 13, 2014

(54) UNSATURATED POLYESTER RESIN OR VINYL ESTER RESIN COMPOSITIONS

(75) Inventors: Johan Franz Gardus Antonius Jansen, Geleen (NL); Ronald Ivo Kraeger, Baarn (NL)

(73) Assignee: DSM IP Assets B.V., Heerlen (NL)

(*) Notice: Subject to any disclaimer, the term of this patent is extended or adjusted under 35 U.S.C. 154(b) by 667 days.

(21) Appl. No.: 12/307,486

(22) PCT Filed: Jul. 5, 2007

(86) PCT No.: PCT/EP2007/005958
§ 371 (c)(1),
(2), (4) Date: Jun. 12, 2009

(87) PCT Pub. No.: WO2008/003493
PCT Pub. Date: Jan. 10, 2008

(65) Prior Publication Data
US 2010/0069575 A1    Mar. 18, 2010

(30) Foreign Application Priority Data

Jul. 6, 2006 (EP) ................................. 06014025

(51) Int. Cl.
| | | |
|---|---|---|
| C08L 67/00 | (2006.01) | |
| C08K 5/07 | (2006.01) | |
| C08L 67/06 | (2006.01) | |
| C08L 33/04 | (2006.01) | |
| C08K 5/00 | (2006.01) | |
| C08K 5/16 | (2006.01) | |
| C08K 3/08 | (2006.01) | |

(52) U.S. Cl.
CPC .............. *C08L 67/06* (2013.01); *C08L 33/04* (2013.01); *C08K 2003/085* (2013.01); *C08K 5/0025* (2013.01); *C08K 5/0091* (2013.01); *C08K 5/16* (2013.01); *C08K 2003/0818* (2013.01)
USPC ........... 523/500; 524/357; 524/563; 524/604; 528/303

(58) Field of Classification Search
CPC ... C08L 33/04; C08L 67/06; C08K 2003/085; C08K 2003/0818; C08K 2003/28; C08K 5/0025; C08K 5/0091; C08K 5/16
USPC .............. 523/329.5, 500; 524/291, 302, 337, 524/357, 394, 413, 563, 604; 525/329.5, 525/49, 303, 415, 360, 15–17, 41; 528/303–304, 306
See application file for complete search history.

(56) References Cited

U.S. PATENT DOCUMENTS

| | | | | |
|---|---|---|---|---|
| 3,950,432 A | * | 4/1976 | Sanchez ................ | 568/561 |
| 5,770,653 A | * | 6/1998 | Matsukawa et al. ...... | 525/168 |
| 6,268,464 B1 | * | 7/2001 | Keinanen et al. ........ | 528/272 |
| 2002/0173593 A1 | * | 11/2002 | Udding et al. ........... | 525/312 |
| 2004/0220340 A1 | | 11/2004 | McAlvin et al. | |
| 2006/0167140 A1 | * | 7/2006 | Altounian et al. ........ | 523/515 |
| 2009/0030151 A1 | * | 1/2009 | Jansen et al. ........... | 525/21 |
| 2009/0156750 A1 | * | 6/2009 | Jansen et al. ............. | 525/329.5 |
| 2010/0029859 A1 | * | 2/2010 | Jansen et al. ........... | 525/360 |
| 2010/0041836 A1 | * | 2/2010 | Jansen et al. ........... | 525/415 |
| 2010/0069549 A1 | * | 3/2010 | Jansen et al. ........... | 524/357 |

FOREIGN PATENT DOCUMENTS

| | | |
|---|---|---|
| EP | 1 342 739 | 9/2003 |
| JP | 02-191633 | 7/1990 |
| JP | 2-191633 | 7/1990 |
| WO | WO 2005/047379 | 5/2005 |
| WO | WO 2006/069285 | 6/2006 |

OTHER PUBLICATIONS

International Search Report for PCT/EP2007/005958, mailed Oct. 25, 2007.
Written Opinion of the International Searching Authority for PCT/EP2007/005958, mailed Oct. 25, 2007.
Database WPI Week 199036, Derwent Publications Ltd., Accession No. 1990-271564.

* cited by examiner

*Primary Examiner* — Hannah Pak
(74) *Attorney, Agent, or Firm* — Nixon & Vanderhye P.C.

(57) ABSTRACT

The present invention relates to an unsaturated polyester resin or vinyl ester resin composition, wherein the unsaturated polyester resin or vinyl ester resin composition comprises an unsaturated polyester resin or vinyl ester resin and a copper compound and an acetoacetamide compound having the following formula:

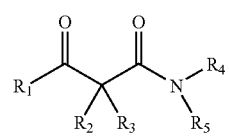

(1)

whereby
$R_1$, $R_2$, $R_3$, $R_4$ and $R_5$ each individually may represent hydrogen (H), or a $C_1$-$C_{20}$ alkyl, $C_6$-$C_{20}$ aryl, alkylaryl or arylalkyl group, that each optionally may contain one or more heteroatoms (e.g. oxygen, phosphor, nitrogen or sulphur atoms) and/or substituents; a ring may be present between $R_1$ and $R_2$, $R_2$ and $R_3$, $R_3$ and $R_5$ and/or between $R_4$ and $R_5$; $R_4$ and $R_5$ may be part of a polymer chain or may be attached to a polymer chain; and the resin being curable with a peroxide and the resin composition contains less than 0.01 mmol cobalt per kg primary resin system and less than 0.01 mmol titanium per kg primary resin system.

19 Claims, No Drawings

UNSATURATED POLYESTER RESIN OR VINYL ESTER RESIN COMPOSITIONS

This application is the U.S. national phase of International Application No. PCT/EP2007/005958, filed 5 Jul. 2007, which designated the U.S. and claims priority to EP Application No. 06014025.8, filed 6 Jul. 2006, the entire contents of each of which are hereby incorporated by reference.

The present invention relates to unsaturated polyester resin or vinyl ester resin compositions that are curable with a peroxide component. In particular, the present invention relates to unsaturated polyester resin or vinyl ester resin compositions for structural parts that are curable with a peroxide component.

The present invention further also relates to objects and structural parts prepared from such unsaturated polyester resin or vinyl ester resin compositions by curing with a peroxide. The present invention finally also relates to methods of peroxide curing of unsaturated polyester resin resin or vinyl ester resin compositions.

As meant herein, objects and structural parts are considered to have a thickness of at least 0.5 mm and appropriate mechanical properties. The term "objects and structural parts" as meant herein also includes cured resin compositions as are used in the field of chemical anchoring, construction, roofing, flooring, windmill blades, containers, tanks, pipes, automotive parts, boats, etc.

In the curing of unsaturated polyester resins and vinyl ester resins, classes of resins that can generally be cured under the influence of peroxides, gel time is a very important characteristic of the curing properties. In addition also the time from reaching the gel time to reaching peak temperature, and the level of the peak temperature (higher peak temperature generally results in better curing) are important.

Apart from that, of course, also the mechanical properties of the objects and/or structural parts obtained in the curing process are important. As meant herein gel time represents the time lapsed in the curing phase of the resin to increase in temperature from 25° C. to 35° C. Normally this corresponds to the time the fluidity (or viscosity) of the resin is still in a range where the resin can be handled easily. In closed mould operations, for instance, this time period is very important to be known.

Accordingly, the term good curing properties reflects, amongst other things, that the resin composition has suitable gel-time properties: i.e. the resin to be cured should remain sufficiently fluid for an acceptable time in the first stage of curing. For good curing properties it is important, that the gel time is rather short, i.e. in the order of some minutes to few tens of minutes. For reasons of process efficiency and results to be achieved, the skilled man accordingly will always try to find options to achieve a minimal gel time, while retaining good mechanical properties of the ultimately cured products. In addition, the skilled man also will try to find curable resin compositions having good storage stability, i.e. being stable (i.e. remain their handling properties without gellification) before being subjected to curing for at least one week after manufacture of the resin composition.

The styrene content in the objects obtained after curing the resin composition is an important factor in the determination how efficient a cure system is. Preferable the residual amount of styrene after cure is as low as possible as this implies that the curing is very efficient. Furthermore, low residual amount of styrene results in lower styrene emission which is advantageous from an environmental point of view.

Moreover, for environmental reasons, the presence of cobalt in resin compositions is less preferred.

W. D. Cook et al. in Polym. Int. Vol. 50, 2001, at pages 129-134 describe in an interesting article various aspects of control of gel time and exotherm behaviour during cure of unsaturated polyester resins. They also demonstrate how the exotherm behaviour during cure of such resins can be followed.

As meant herein the term gel-time drift (for a specifically selected period of time, for instance 30 or 60 days) reflects the phenomenon, that—when curing is performed at another point of time than at the reference standard moment for curing, for instance 24 hours after preparation of the resin—the gel time observed is different from that at the point of reference. For unsaturated polyester resins and vinyl ester resins, as can generally be cured under the influence of peroxides, gel time represents the time lapsed in the curing phase of the resin to increase in temperature from 25° C. to 35° C. Normally this corresponds to the time the fluidity (or viscosity) of the resin is still in a range where the resin can be handled easily. In closed mould operations, for instance, this time period is very important to be known. The lower the gel-time drift is, the better predictable the behavior of the resin (and the resulting properties of the cured material) will be.

Gel time drift (hereinafter: "Gtd") can be expressed in a formula as follows:

$$\text{Gtd} = (T_{25 \to 35° C. \text{ at } y\text{-days}} - T_{25\text{-}35° C. \text{ after mixing}}) / T_{25 \to 35° C. \text{ after mixing}} \times 100\% \quad \text{(formula 1)}$$

In this formula $T_{25 \to 35° C.}$ (which also might be represented by $T_{gel}$) represents, as mentioned above, the time lapsed in the curing phase of the resin to increase in temperature from 25° C. to 35° C. The additional reference to "at y days" shows after how many days of preparing the resin the curing is effected.

All polyester resins, by their nature, undergo some changes over time from their production till their actual curing. One of the characteristics where such changes become visible is the gel-time drift. The state of the art unsaturated polyester resin or vinyl ester resin systems generally are being cured by means of initiation systems. In general, such unsaturated polyester resin or vinyl ester resin systems are cured under the influence of peroxides and are accelerated (often even pre-accelerated) by the presence of metal compounds, especially cobalt salts, as accelerators. Cobalt naphthenate and cobalt octanoate are the most widely used accelerators. In addition to accelerators, the polyester resins usually also contain inhibitors for ensuring that the resin systems do not gellify prematurely (i.e. that they have a good storage stability). Furthermore, inhibitors are being used to ensure that the resin systems have an appropriate gel time and/or for adjusting the gel-time value of the resin system to an even more suitable value.

Most commonly, in the state of the art, polymerization initiation of unsaturated polyester resins, etc. by redox reactions involving peroxides, is accelerated or pre-accelerated by a cobalt compound in combination with another accelerator.

An excellent review article of M. Malik et al. in J. M. S.—Rev. Macromol. Chem. Phys., C40(2&3), p. 139-165 (2000) gives a good overview of the current status of resin systems.

The present inventors now, surprisingly, found that unsaturated polyester resin or vinyl ester resin systems with efficient curing performance when cured with a peroxide could be obtained by using a resin composition comprising an unsaturated polyester resin or vinyl ester resin, and an accelerator comprising a copper compound and an acetoacetamide compound having the following formula:

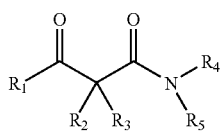

(1)

whereby $R_1$, $R_2$, $R_3$, $R_4$ and $R_5$ each individually may represent hydrogen (H), or a $C_1$-$C_{20}$ alkyl, $C_6$-$C_{20}$ aryl, alkylaryl or arylalkyl group, that each optionally may contain one or more heteroatoms (e.g. oxygen, phosphor, nitrogen or sulphur atoms) and/or substituents; a ring may be present between $R_1$ and $R_2$, $R_2$ and $R_3$, $R_3$ and $R_5$ and/or between $R_4$ and $R_5$;

$R_4$ and/or $R_5$ may be part of a polymer chain or may be attached to a polymer chain;

and the resin being curable with a peroxide and the resin composition contains less than 0.01 mmol cobalt per kg primary resin system and less than 0.01 mmol titanium per kg primary resin system.

Most preferably the resin composition is free of cobalt and free of titanium

Surprisingly it has been found that with the resin compositions according to the invention, resin systems can be obtained with high curing efficiency, such as short gel time, short peak time, high peak temperature and/or low temperature curing (temperature between 0 and 50° C.; so-called cold-curing). In the curing of unsaturated polyester resins or vinyl esters, gel time is a very important characteristic of the curing properties. In addition also the time from reaching the gel time to reaching peak temperature, and the level of the peak temperature (higher peak temperature generally results in better curing) are important. In addition, resins can be obtained which exhibit a reduced gel time drift tendency and improved thermal stability. Furthermore the objects obtained from the resin formulations according to the invention also have very low residual amounts of benzaldehyde and residual amounts of styrene. In fact cured objects can be obtained using formulations according to the invention in which styrene and benzaldehyde can no longer be detected, which is very surprising in view of the residual amounts of styrene and benzaldehyde as obtained with formulations according to the state of the art which are cured with cobalt.

WO-A-03/101918 describes a substantially HAP (Hazardous Air Pollutants)-free polyester composition comprising unsaturated polyester resin, a reactive diluent (not being styrene) and optionally a promoter and/or copromoter. Examples of effective promoters are said to be metal compounds (such as cobalt, manganese, potassium, iron, vanadium, copper and aluminium salts of organic acids); amines (such as dimethylaniline, diethylanilinie, phenyl diethanolamine, dimethyl paratoluidine, and 2-aminopyridine); Lewis acids (such as boron fluoride dehydrate and ferric chloride); bases (such as tetramethyl ammonium hydroxide); quaternary ammonium salts (such as trimethyl benzyl ammonium chloride and tetrakismethylol phosphonium chloride); an sulphur compounds (such as dodecyl mercaptan and 2-mercaptoethanol); dimethylacetoacetamide; ethyl acetoacetate, and methyl acetoacetate. Most preferred promoters include cobalt octanoate, potassium octanoate, dimethyl acetoacetamide, ethyl acetoacetate, and methyl acetoacetate. There is no indication in this reference that acceleration can also be achieved with the combination of a copper compound and an acetoacetamide compound according to formula (1). In addition, it has been found that the use of ethyl acetoacetate or methyl acetoacetate in combination with a copper compound does not result in efficient curing.

EP-A-1149131 discloses a compounded unsaturated polyester resin composition comprising at least two types of unsaturated polyesters; a promoter, preferably a metal compound, such as cobalt, manganese, iron, vanadium, copper or an aluminum salt of an organic acid; and an amine promoter like dimethylaniline, diethylaniline, 2-aminopyridine, N,N-dimethyl acetoacetamide, acetoacetanilide or other organic compounds like ethyl acetoacetate, methyl acetoacetate and N,N-dimethyl-p-toluidine. There is no indication in this reference that improved acceleration can be achieved with the specific combination of a copper compound and an acetoacetamide compound according to formula (1). In addition, it has been found that the use of common 1,3-dioxo compounds like acetyl acetone, ethyl acetoacetate or methyl acetoacetate in combination with a copper compound does not result in efficient curing.

It is known in the prior art that copper can be used as inhibitor for unsaturated polyester resin and vinyl ester resin compositions. U.S. Pat. No. 5,861,466 teaches that a copper salt acts as shelf life stability inhibitor for a vinyl ester resin esterified to a very low epoxy value. Also US2004/0010061, example 2 teaches that copper naphtenate acts as an inhibitor in styrene-free unsaturated resin compositions formulated with a cobalt carboxylate, vanadium, potassium, zinc or iron compound. U.S. Pat. No. 4,829,106 and US2004/0220340 also teach that copper salts act as inhibitors for unsaturated polyester resins.

JP-A-2191633 discloses that radical curing of unsaturated polyester resins or vinyl ester resins at room temperature can be effected by using a cure system containing a cobalt compound, a stimulating adjuvant being an acetacetonate amine compound that contains an N-acetacetyl group that has been linked with the nitrogen atom in a secondary amino group, and a copper compound as stabiliser. There is no teaching that efficient curing can be effected essentially free of cobalt using the combination of a copper compound and an acetoacetamide compound according to formula (1). On the contrary, this reference also teaches that copper salts act as inhibitors for unsaturated polyester resins or vinyl ester resins.

It has now surprisingly been found that although essentially free of cobalt, efficient curing of unsaturated polyester resins or vinyl ester resins can be performed by using a copper compound and an acetoacetamide compound according to formula (1).

The unsaturated polyester resin or vinyl ester resin as is comprised in the resin compositions according to the present invention, may suitably be selected from the unsaturated polyester resins or vinyl ester resin as are known to the skilled man. Examples of suitable unsaturated polyester or vinyl ester resins to be used as basic resin systems in the resins of the present invention are, subdivided in the categories as classified by Malik et al., cited above.

(1) Ortho-resins: these are based on phthalic anhydride, maleic anhydride, or fumaric acid and glycols, such as 1,2-propylene glycol, ethylene glycol, diethylene glycol, triethylene glycol, 1,3-propylene glycol, dipropylene glycol, tripropylene glycol, neopentyl glycol or hydrogenated bisphenol-A. Commonly the ones derived from 1,2-propylene glycol are used in combination with a reactive diluent such as styrene.

(2) Iso-resins: these are prepared from isophthalic acid, maleic anhydride or fumaric acid, and glycols. These resins may contain higher proportions of reactive diluent than the ortho resins.

(3) Bisphenol-A-fumarates: these are based on ethoxylated bisphenol-A and fumaric acid.
(4) Chlorendics: are resins prepared from chlorine/bromine containing anhydrides or phenols in the preparation of the UP resins.
(5) Vinyl ester resins: these are resins, which are mostly used because of their because of their hydrolytic resistance and excellent mechanical properties, as well as for their low styrene emission, are having unsaturated sites only in the terminal position, introduced by reaction of epoxy resins (e.g. diglycidyl ether of bisphenol-A, epoxies of the phenol-novolac type, or epoxies based on tetrabromobisphenol-A) with (meth)acrylic acid. Instead of (meth)acrylic acid also (meth)acrylamide may be used.

Besides these classes of resins also so-called dicyclopentadiene (DCPD) resins can be distinguished as unsaturated polyester resin. As used herein, a vinyl ester resin is a (meth)acrylate functional resin. Besides the vinyl ester resins as described in Malik et al., also the class of vinyl ester urethane resins (also referred to urethane methacylate resins) can be distinguished as vinyl ester resins. Preferably, the vinyl ester resin used in the present invention is a resin that is obtained by the esterification of an epoxy resin with a (meth)acrylic acid or a (meth)acrylamide.

All of these resins, as can suitably be used in the context of the present invention, may be modified according to methods known to the skilled man, e.g. for achieving lower acid number, hydroxyl number or anhydride number, or for becoming more flexible due to insertion of flexible units in the backbone, etc. The class of DCPD-resins is obtained either by modification of any of the above resin types by Diels-Alder reaction with cyclopentadiene, or they are obtained alternatively by first reacting maleic acid with dicyclopentadiene, followed by the resin manufacture as shown above.

Of course, also other reactive groups curable by reaction with peroxides may be present in the resins, for instance reactive groups derived from itaconic acid, citraconic acid and allylic groups, etc. Accordingly, the unsaturated polyester resins or vinyl ester resins used in the present invention may contain solvents. The solvents may be inert to the resin system or may be reactive therewith during the curing step. Reactive solvents are particularly preferred. Examples of suitable reactive solvents are styrene, α-methylstyrene, (meth)acrylates, N-vinylpyrrolidone and N-vinylcaprolactam.

The unsaturated polyester resins and vinyl ester resins as are being used in the context of the present invention may be any type of such resins, but preferably are chosen from the group of DCPD-resins, iso-phthalic resins and ortho-phthalic resins and vinyl ester resins. More detailed examples of resins belonging to such groups of resins have been shown in the foregoing part of the specification. More preferably, the resin is an unsaturated polyester resin preferably chosen from the group of DCPD-resins, iso-phthalic resins and ortho-phthalic resins.

The resin composition according to the invention preferably has an acid value in the range of from 0.001-300 mg KOH/g of resin composition. As used herein, the acid value of the resin composition is determined titrimetrically according to ISO 2114-2000. Preferably, the molecular weight of the unsaturated polyester resin or vinyl ester resin is in the range of from 500 to 200.000 g/mole. As used herein, the molecular weight of the resin is determined using gel permeation chromatography according to ISO 13885-1.

The resin composition according to the present invention generally contains less than 5 wt. % water.

In the context of the invention all kinds of copper compounds can be used as copper accelerator compound. According to the invention, the copper accelerator compound present in the resin composition is preferably a copper salt or complex. More preferably, the copper compound is a $copper^+$ compound or a $copper^{2+}$ compound, more preferably a $copper^{2+}$ compound. The compound is preferably a $copper^+$ salt or complex or a $copper^{2+}$ salt or complex. Even more preferably, the copper compound is a $copper^+$ salt or $copper^{2+}$ salt, more preferably a $copper^{2+}$ salt. In view of the solubility of the copper compound in the resin composition, the copper compound is preferably an organo soluble copper compound like for instance copper carboxylates, copper acetoacetates and copper chlorides. It will be clear that, instead of a single copper compound also a mixture of copper compounds can be used.

The copper compound is present in the resin composition according to the invention in an amount of at least 50 ppm (relative to the primary resin system) (0.8 mmol Cu per kg of primary resin system), preferably in an amount of at least 100 ppm Cu. The upper limit of the copper content is not very critical, although for reasons of cost efficiency of course no extremely high concentrations will be applied. Generally the concentration of the copper compound in the primary resin system will be such that the copper is present in an amount lower than 1000 ppm Cu (relative to the primary resin system) (16 mmol Cu per kg of primary resin system), preferably lower than 500 ppm Cu.

For understanding of the invention, and for proper assessment of the amounts of copper compound to be present in the resin composition, the term "primary resin system" as used herein is understood to mean the total weight of the resin, but excluding any fillers as may be used when applying the resin system for its intended uses. The primary resin system therefore consists of the unsaturated polyester resin or vinyl ester resin, any additives present therein (except for the peroxide component that is to be added shortly before the curing) soluble in the resin, such as accelerators, promoters, inhibitors, low-profile agents, colorants (dyes), thixotropic agents, release agents etc., as well as styrene and/or other solvents as may usually be present therein. The amount of additives soluble in the resin usually may be as from 1 to 25 wt. % of the primary resin system; the amount of styrene and/or other solvent may be as large as up to 50 wt. % of the primary resin system. The primary resin system, however, explicitly does not include compounds not being soluble therein, such as fillers (e.g. glass or carbon fibers), talc, clay, solid pigments (such as, for instance, titanium dioxide (titanium white)), flame retardants, e.g. aluminium oxide hydrates, etc.

The acetoacetamide compound is a compound having the following formula:

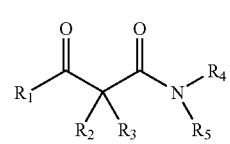

(1)

whereby
$R_1$, $R_2$, $R_3$, $R_4$ and $R_5$ each individually may represent hydrogen (H), or a $C_1$-$C_{20}$ alkyl, $C_6$-$C_{20}$ aryl, alkylaryl or arylalkyl group, that each optionally may contain one or more heteroatoms (e.g. oxygen, phosphor, nitrogen or sulphur atoms) and/or substituents; a ring may be present between $R_1$ and $R_2$, $R_2$ and $R_3$, $R_3$ and $R_5$ and/or between $R_4$ and $R_5$;

$R_4$ and/or $R_5$ may be part of a polymer chain or may be attached to a polymer chain.

Preferably, $R_1$ is a $C_1$-$C_{20}$ alkyl group; more preferably, $R_1$ is a methyl group. Preferably, at least one of $R_2$ and $R_3$ is hydrogen. Preferably, $R_4$ and $R_5$ each individually represents hydrogen, methyl or ethyl or $R_4$ is hydrogen and $R_5$ is an alkylaryl or arylalkyl group. More preferably, at least one of $R_4$ and $R_5$ is hydrogen. Even more preferably, $R_4$ and $R_5$ are hydrogen.

Preferably, the amount of the acetoacetamide compound is from 0.05 to 5% by weight, calculated on the total weight of the primary resin system. More preferably, amount of the acetoacetamide compound is from 0.25 to 2% by weight.

The molar ratio between copper and the acetoacetamide compound is preferably from 10:1 to 1:500, more preferably from 2:1 to 1:60.

In a preferred embodiment of the invention, the resin composition according to the present invention also comprises a base. In a more preferred embodiment of the invention, the base is added to the resin composition comprising the copper compound and the acetoacetamide compound because this results in a more efficient curing, i.e. shorter gel time and/or higher peak temperature.

Preferably, the base is an organic base with $pK_a \geq 10$ or the base is an alkali metal or earth alkali metal compound. More preferably, the base is an alkali metal or earth alkali metal compound. The organic base with $pK_a \geq 10$ is preferably a nitrogen-containing compound, preferably an amine, more preferably a tertiary amine. The alkali metal or earth alkali metal compound is preferably an oxide, hydroxide, carboxylate, carbonate or hydrocarbonate. Preferably, the alkali metal is not lithium and the earth alkali metal is not magnesium in view of the low solubility of lithium and magnesium compounds in the resin composition. Most preferably, the base is a potassium compound. The potassium compound is preferably a potassium carboxylate, preferably a potassium $C_6$-$C_{20}$ carboxylate. In a preferred embodiment of the present invention, the potassium carboxylate is in-situ formed by adding potassium hydroxide to the resin composition.

Preferably, the amount of the base is from 0.001 to 2.000 mmol/kg of primary resin system. More preferably, the amount of the base is from 0.01 to 200 mmol/kg of primary resin system.

In the resin composition, the molar ratio between the copper and the basic functionality of the base is preferably from 40:1 to 1:200, more preferably from 2.5:1 to 1:25. The molar ratio between the acetoacetamide compound and the basic functionality of the base is preferably from 400:1 to 1:40, more preferably from 25:1 to 1:8.

The resin composition according to the present invention are being curable with a peroxide compound. The peroxides used for the initiation can be any peroxide known to the skilled man for being used in curing of unsaturated polyester resins. Such peroxides include organic and inorganic peroxides, whether solid or liquid; also hydrogen peroxide may be applied. Examples of suitable peroxides are, for instance, peroxy carbonates (of the formula —OC(O)O—), peroxyesters (of the formula —C(O)OO—), diacylperoxides (of the formula —C(O)OOC(O)—), dialkylperoxides (of the formula —OO—), etc. The peroxides can also be oligomeric or polymeric in nature. An extensive series of examples of suitable peroxides can be found, for instance, in US 2002/0091214-A1, paragraph [0018]. The skilled man can easily obtain information about the peroxides and the precautions to be taken in handling the peroxides in the instructions as given by the peroxide producers.

Preferably, the peroxide is chosen from the group of organic peroxides. Examples of suitable organic peroxides are: tertiary alkyl hydroperoxides (such as, for instance, t-butyl hydroperoxide), other hydroperoxides (such as, for instance, cumene hydroperoxide), the special class of hydroperoxides formed by the group of ketone peroxides (perketones, being an addition product of hydrogen peroxide and a ketone, such as, for instance, methyl ethyl ketone peroxide and acetylacetone peroxide), peroxyesters or peracids (such as, for instance, t-butyl peresters, benzoyl peroxide, peracetates and perbenzoates, lauryl peroxide, including (di)peroxyesters), perethers (such as, for instance, peroxy diethyl ether). Often the organic peroxides used as curing agent are tertiary peresters- or tertiary hydroperoxides, i.e. peroxy compounds having tertiary carbon atoms directly united to an —OO-acyl or —OOH group. Clearly also mixtures of these peroxides with other peroxides may be used in the context of the present invention. The peroxides may also be mixed peroxides, i.e. peroxides containing any two of different peroxygen-bearing moieties in one molecule). In case a solid peroxide is being used for the curing, the peroxide is preferably benzoyl peroxide (BPO).

Most preferably, however, the peroxide is a liquid hydroperoxide. The liquid hydroperoxide, of course, also may be a mixture of hydroperoxides. Handling of liquid hydroperoxides when curing the resins for their final use is generally easier: they have better mixing properties and dissolve more quickly in the resin to be cured.

In particular it is preferred that the peroxide is selected from the group of ketone peroxides, a special class of hydroperoxides. The peroxide being most preferred in terms of handling properties and economics is methyl ethyl ketone peroxide (MEK peroxide).

The peroxide may be solid or liquid. Examples of suitable peroxides are: tertiary alkyl hydroperoxides (such as, for instance, t-butyl hydroperoxide), other hydroperoxides (such as, for instance, cumene hydroperoxide), the special class of hydroperoxides formed by the group of ketone peroxides (perketones, being an addition product of hydrogen peroxide and a ketone, such as, for instance, methyl ethyl ketone peroxide and acetylacetone peroxide). Often the organic peroxides used as curing agent are tertiary hydroperoxides, i.e. peroxy compounds having tertiary carbon atoms directly united to an —OOH group. Clearly also mixtures of these peroxides with other peroxides may be used in the context of the present invention. The peroxides may also be mixed peroxides, i.e. peroxides containing any two of different peroxygen-bearing moieties in one molecule).

Most preferably, however, the peroxide is a liquid hydroperoxide. The liquid hydroperoxide, of course, also may be a mixture of hydroperoxides. Handling of liquid hydroperoxides when curing the resins for their final use is generally easier: they have better mixing properties and dissolve more quickly in the resin to be cured.

In particular it is preferred that the peroxide is selected from the group of ketone peroxides, a special class of hydroperoxides. The peroxide being most preferred in terms of handling properties and economics is methyl ethyl ketone peroxide (MEK peroxide).

In a preferred embodiment of the invention, the resin composition according to the invention also contains one or more reactive diluents, preferably in an amount of at least 5 weight %.

Such reactive diluents are especially relevant for reducing the viscosity of the resin in order to improve the resin handling properties, particularly for being used in techniques like vacuum injection, etc. However, the amount of such reactive diluent in the resin composition according to the invention is not critical. Preferably, the reactive diluent is a methacrylate and/or styrene.

In a further preferred embodiment of the present invention, the resin composition also contains one or more radical inhibitors.

More preferably, the resin compositions according to the invention contain one or more radical inhibitors selected from the groups of phenolic compounds, stable radicals like galvinoxyl and N-oxyl based compounds, catechols and/or phenothiazines The amount of radical inhibitor as used in the context of the present invention, may, however, vary within rather wide ranges, and may be chosen as a first indication of the gel time as is desired to be achieved. Preferably, the amount of phenolic inhibitor is from about 0.001 to 35 mmol per kg of primary resin system, and more preferably it amounts to more than 0.01, most preferably more than 0.01 mmol per kg of primary resin system. The skilled man quite easily can assess, in dependence of the type of radical inhibitor selected, which amount thereof leads to good results according to the invention.

Suitable examples of radical inhibitors that can be used in the resin compositions according to the invention are, for instance, 2-methoxyphenol, 4-methoxyphenol, 2,6-di-t-butyl-4-methylphenol, 2,6-di-t-butylphenol, 2,4,6-trimethylphenol, 2,4,6-tris-dimethylaminomethyl phenol, 4,4'-thio-bis (3-methyl-6-t-butylphenol), 4,4'-isopropylidene diphenol, 2,4-di-t-butylphenol, 6,6'-di-t-butyl-2,2'-methylene di-p-cresol, hydroquinone, 2-methylhydroquinone, 2-t-butylhydroquinone, 2,5-di-t-butylhydroquinone, 2,6-di-t-butylhydroquinone, 2,6-dimethylhydroquinone, 2,3,5-trimethylhydroquinone, catechol, 4-t-butylcatechol, 4,6-di-t-butylcatechol, benzoquinone, 2,3,5,6-tetrachloro-1,4-benzoquinone, methylbenzoquinone, 2,6-dimethylbenzoquinone, napthoquinone, 1-oxyl-2,2,6,6-tetramethylpiperidine, 1-oxyl-2,2,6,6-tetramethylpiperidine-4-ol (a compound also referred to as TEMPOL), 1-oxyl-2,2,6,6-tetramethylpiperidine-4-one (a compound also referred to as TEMPON), 1-oxyl-2,2,6,6-tetramethyl-4-carboxyl-piperidine (a compound also referred to as 4-carboxy-TEMPO), 1-oxyl-2,2,5,5-tetramethylpyrrolidine, 1-oxyl-2,2,5,5-tetramethyl-3-carboxylpyrrolidine (also called 3-carboxy-PROXYL), aluminium-N-nitrosophenyl hydroxylamine, diethylhydroxylamine, phenothiazine and/or derivatives or combinations of any of these compounds.

Advantageously, the amount of radical inhibitor in the resin composition according to the invention is in the range of from 0.0001 to 10% by weight, calculated on the total weight of the primary resin system of the resin composition. More preferably, the amount of radical inhibitor in the resin composition is in the range of from 0.001 to 1% by weight.

The unsaturated polyester resin or vinyl ester resin composition according to the present invention can be applied in all applications as are usual for such types of resins. In particular they can suitably used in closed mould applications, but they also can be applied in open mould applications. For closed mould applications it is especially important that the manufacturer of the closed mould products reliably can use the favorable (i.e. reduced) gel-time drift tendency of the resin compositions according to the invention. End segments where the unsaturated polyester resin or vinyl ester resin compositions according to the present invention can be applied are also marine applications, chemical anchoring, roofing, construction, relining, pipes & tanks, flooring, windmill blades, etc. That is to say, the resin compositions according to the invention can be used in all known uses of unsaturated polyester resins and vinyl ester resins.

The present invention further also relates to all such objects or structural parts as are being obtained when curing the unsaturated polyester resin or vinyl ester resin compositions according to the invention with a peroxide compound. These objects and structural parts have excellent mechanical properties.

The present invention further also relates to a process for radically curing a resin composition according to the invention by adding a peroxide to the resin composition and by effecting the curing essentially free of cobalt, preferably in the absence of cobalt and preferably in the absence of titanium. Essentially free of cobalt means that the cobalt concentration is lower than 0.01 mmol Co per kg primary resin system, preferably lower than 0.001 mmol Co per kg primary resin system. It has been surprisingly found that the combination of the copper compound and the acetoacetamide compound accelerates the radically curing of the unsaturated polyester or vinyl ester with the peroxide. Preferably, the curing is effected at a temperature in the range of from −20 to +200° C., preferably in the range of from −20 to +100° C., and most preferably in the range of from −10 to +60° C. (so-called cold curing).

The present invention also relates to a two-component composition comprising a first component and a second component wherein the first component being the unsaturated polyester resin or vinyl ester resin composition according to the present invention and the second component comprises a peroxide compound. As used herein, the term "two-component system" refers to systems where two separate components (A and B) are being spatially separated from each other, for instance in separate cartridges or the like, and is intended to include any system wherein each of such two separate components (A and B) may contain further separate components. The components are combined at the time the system is used.

The invention is now demonstrated by means of a series of examples and comparative examples. All examples are supportive of the scope of claims. The invention, however, is not restricted to the specific embodiments as shown in the examples.

EXPERIMENTAL PART

The resins used for curing are commercially available products from DSM Composite Resins, Schaffhausen, Switzerland and in addition thereto also a resin-hereinafter referred to as Resin A—was specifically prepared on behalf of the inventors for being used in the tests. The peroxides used for curing are commercially available products from Akzo Nobel Inc.

Preparation of Resin A 184.8 g of propylene glycol (PG), 135.8 g of diethylene glycol (DEG), 216.1 g of phthalic anhydride (PAN), 172.8 g of maleic anhydride (MAN), and 0.075 g 2-t-butylhydroquinone were charged in a vessel equipped with a reflux condenser, a temperature measurement device and inert gas inlet. The mixture was heated slowly by usual methods to 205° C. At 205° C. the mixture was kept under reduced pressure until the acid value reached a value below 16 mg KOH/g resin and the falling ball viscosity at 100° C. was below 50 dPa·s. Then the vacuum was relieved with inert gas, and the mixture was cooled down to 130° C., and thereafter the solid UP resin so obtained was transferred to a mixture of 355 g of styrene and 0.07 g of mono-t-butyl-hydroquinone and was dissolved at a temperature below 80° C. The final resin viscosity reached at 23° C. was 640 mPa·s, and the Non Volatile Matter content was 64.5 wt. %.

Monitoring of Curing

In most of the Examples and Comparative Examples presented hereinafter it is mentioned, that curing was monitored by means of standard gel time equipment. This is intended to mean that both the gel time ($T_{gel}$ or $T_{25 \rightarrow 35° C.}$) and peak time ($T_{peak}$ or $T_{25 \rightarrow peak}$) were determined by exotherm measurements according to the method of DIN 16945 when curing the resin with the peroxides as indicated in the Examples and Comparative Examples. The equipment used therefore was a Soform gel timer, with a Peakpro software package and National Instruments hardware; the waterbath and thermostat used were respectively Haake W26, and Haake DL30. For some of the Examples and Comparative Examples also the gel-time drift (Gtd) was calculated. This was done on the basis of the gel times determined at different dates of curing according to formula 1:

$$\text{Gtd} = (T_{25 \rightarrow 35° C. at} y\text{-days} - T_{25 \rightarrow 35° C. after mixing}) / T_{25 \rightarrow 35° C. after mixing} \times 100\% \quad \text{(formula 1)}$$

with "y" indicating the number of days after mixing.

Example 1 and Comparative Experiments A-D

Formulations were prepared based on 90 g resin A 10 g styrene 0.24 g Cu naphtenate solution (8% Cu in spirits) and 1 g of various oxygen containing ligands. After stirring for 5 min the mixtures were cured at 25° C. using 3% (relative to the primary resin system) Butanox M50 and the cure was monitored with the gel timer. The results are shown in table 1.

TABLE 1

| | Ligand | Gel time (min) | peak time (min) | Peak temp (° C.) |
|---|---|---|---|---|
| 1a | acetoacetamide | 23 | 29 | 174 |
| comp a | acetyl acetone | >180 | | |
| comp b | ethyl acetoacetate | >180 | | |
| comp c | Glycol | >180 | | |
| comp d | dimethylglycol | >180 | | |

These results clearly indicate that an efficient curing is only obtained with the system according to the invention.

Examples 2a-2d

Formulations were prepared based on 90 g resin A, 10 g styrene, 0.24 g Cu naphtenate solution (8% Cu) and 1 g of various acetoacetamides. After stirring for 5 min the mixtures were cured using 3% (relative to the primary resin system) Butanox M-50 and the cure was monitored with the gel timer. The results are shown in table 2.

TABLE 2

| | Ligand | Gel time (min) | peak time (min) | Peak temp (° C.) |
|---|---|---|---|---|
| 2a = 1a | acetoacetamide | 23 | 29 | 174 |
| 2b | N,N-dimethyl acetoacetamide | 29 | 38 | 148 |
| 2c | N,N-diethyl acetoacetamide | 32 | 41 | 155 |
| 2d | acetoacetanilide | 75 | 96 | 127 |

These experiments clearly demonstrate that various acetoacetamides can be used.

Examples 3a-3d

The experiments of example 2 were repeated except that next to the acetoacetamides also 1 g K octanoate solution (15% in PEG) was added. The results are shown in table 3.

TABLE 3

| | Ligand | Gel time (min) | peak time (min) | Peak temp (° C.) |
|---|---|---|---|---|
| 3a | acetoacetamide | 1.3 | 3.4 | 202 |
| 3b | N,N-dimethyl acetoacetamide | 2.5 | 5.1 | 198 |
| 3c | N,N-diethyl acetoacetamide | 2.7 | 5.7 | 200 |
| 3d | acetoacetanilide | 2.2 | 5.2 | 195 |

Comparing examples 2 with 3 clearly shows that the curing can be further accelerated by the addition of a potassium compound.

Examples 4a-b

Formulations were prepared based on 90 g resin A, 10 g styrene, 0.24 g Cu naphtenate solution (8% Cu) and 1 g of acetoacetamide. After stirring for 5 min the mixtures were cured using 3% (relative to the primary resin system) of various peroxides and the cure was monitored with the gel timer. The results are shown in table 4.

TABLE 4

| Ex | peroxide | Gel time (min) | peak time (min) | peak temp (° C.) |
|---|---|---|---|---|
| 4a | Trigonox 44B | 73.5 | 83.2 | 171 |
| 4b | Cyclonox LE50 | 12.9 | 18.5 | 137 |

These examples demonstrate that various peroxides can be used for curing the resin composition according to the invention

Examples 5a-5j

Formulations were prepared based on 200 g resin, 0.48 g Cu naphtenate solution (8% Cu), 2 g acetoacetamide and 0.016 g t-butylcatechol. After stirring for 5 min the mixtures were divided into portions of 100 g each. The first portions were cured immediately after mixing using 3% (relative to the primary resin system) Butanox M50 and the cure was monitored with the gel timer. The second portions were cured after 30 days storage. The results are shown in table 5.

TABLE 5

| | time | Resin | Gel time (min) | peak time (min) | peak temp (° C.) | gel time drift after 30 days (%) |
|---|---|---|---|---|---|---|
| 5a | 0 | A/styrene (90/10) | 32.5 | 39.2 | 176 | |
| 5b | 30 | | 30.2 | 37.4 | 176 | −7 |
| 5c | 0 | Palatal P 4-01/ | 46.7 | 60 | 106 | |
| 5d | 30 | styrene (90/10) | 51.7 | 66 | 109 | 11 |
| 5e | 0 | Palatal P 5-01/ | 70.8 | 80.7 | 124 | |
| 5f | 30 | styrene (90/10) | 78.6 | 90.5 | 121 | 11 |
| 5g | 0 | Daron XP45-A-2 | 114.1 | 125.5 | 155 | |
| 5h | 30 | | 110.2 | 124 | 150 | −3 |
| 5i | 0 | Synolite 8388-N-1 | 72.9 | 81.8 | 135 | |
| 5j | 30 | | 70.2 | 81.9 | 132 | −4 |

These results indicate that various resins including DCPD and vinylester resins can be cured according to the invention. These examples further demonstrate that inhibitors can be used to tune the gel time. Moreover these results indicate that drift free resin systems can be obtained with the cure system according to the invention. For comparison, the gel time drift after 30 days of the ortho resin systems containing the same amount of inhibitor and containing cobalt instead of copper in the same molar amount, but without acetoacetamide, is for Resin A, Palatal P 4-01 and Palatal P 5-01 34%, 65% and 70% respectively.

Examples 6a-b 4 mm castings were prepared based on 500 g resin A according to the formulations described below in table 6 (all amounts are in gram) and cured with Butanox M50. The 4 mm castings were made between hardened borosilicate glass that was separated with a 4 mm EPDM U-shaped rim.

The casting were released and post cured during 24 hrs at 60° C. and 24 hrs at 80° C. Mechanical properties of the cured objects were determined according to ISO 527-2. The Heat Distortion Temperature (HDT) was measured according to ISO 75-Ae. Residual styrene contents were measured by gaschromatography using GC-FID (Gas Chromatography with a Flame Ionization Detector), using butylbenzene as an internal standard, after extraction of the cured objects in dichloromethane for 48 hrs.

TABLE 6

|  | 6a | 6b |
|---|---|---|
| resin A | 500 | 500 |
| Cu Naphtenate (8% Cu) | 1.19 | 0.50 |
| K naphtenate in spirits (10% K) |  | 0.50 |
| Acetoacetamide | 5 | 1 |
| Butanox M50 | 10 | 10 |
| HDT (° C.) | 66 | 71 |
| Tensile strength (MPa) | 79 | 52 |
| Emodulus (GPa) | 3.6 | 3.9 |
| Elongation at Break (%) | 3.2 | 1.6 |
| rest styrene (%) | <0.1 | <0.1 |
| Barcol hardness | 44 | 45 |

These castings results further indicate that the cure system according to the invention can be used for construction purposes.

Examples 7a-7e and Comparative Experiments E-F 4 mm castings were prepared as described above, based on 500 g resin as the A component, and cured according to the formulations described below in which all amounts are in grams. The castings were post-cured for 16 hrs at 40° C. Mechanical properties of the cured objects were determined according to ISO 527-2. The Heat Distortion Temperature (HDT) was measured according to ISO 75-Ae. Residual styrene contents and residual benzaldehyde content were measured by gaschromatography using GC-FID (Gas Chromatography with a Flame Ionization Detector), using butylbenzene as an internal standard, after extraction of the cured objects in dichloromethane for 48 hrs.

TABLE 7

|  | Comp E | 7a | 7b | Comp F | 7c | 7d | 7e |
|---|---|---|---|---|---|---|---|
| Palatal P 4-01 | 500.00 | 500.00 | 500.00 |  |  |  |  |
| Syn 8388-N-1 |  |  |  | 500.00 | 500.00 | 500.00 | 500.00 |
| Cobalt-2-ethylhexanoate 10% Co | 0.27 |  |  | 0.27 |  |  |  |
| Potassium-2-ethylhexanoate 10% K |  |  | 5.00 |  |  | 5.07 | 3.99 |
| Coppernaphthenate 8% Cu |  | 1.18 | 1.23 |  | 1.24 | 1.02 | 1.04 |
| Acetoacetamide |  | 5.00 |  |  | 5.11 |  |  |
| N,N-Diethylacetoacetamide |  |  | 5.00 |  |  | 5.16 | 4.01 |
| Butanox M50 | 10 | 10 | 10 | 10 | 10 | 10 | 10 |
| HDT (° C.) | 53.5 | 38.0 | 56.1 | 62.0 | 66.9 | 68.0 | 68.1 |
| Tens. Str. (Mpa) | 70 | 28 | 53 | 63 | 52 | 48 | 68 |
| E-Modulus (Mpa) | 4077 | 1471 | 4007 | 3645 | 4046 | 3694 | 3868 |
| Elong. at break (%) | 2.0 | 9.6 | 1.4 | 2.1 | 1.4 | 1.4 | 2.0 |
| Residual styrene (%) | 1.2 | <0.01 | <0.01 | 1.8 | 0.4 | 0.1 | 0.5 |
| Residual benzaldehyde (%) | 0.1 | <0.01 | <0.01 | 0.1 | <0.01 | <0.01 | <0.01 |

These results clearly indicate that castings can be prepared with comparable mechanical properties and surprisingly very low rest styrene and rest benzaldehyde amounts i.e. sometimes below the detection limit. This is advantageous in view of lower emissions of these compounds to the environment.

Examples 8a-8d and Comparative Experiment G

To 100 grams of Palatal P 4-01 amounts of different bases have been added as listed in Table below, all amounts are in grams. Reactivity was measured and 2- and 4 mm castings were made. The 2 mm castings were cured in an open mould with the top side in contact with air. The 4 mm castings were made between hardened borosilicate glass that was separated with a 4 mm EPDM U-shaped rim. After 24 hrs at 20° C. part of the material was post-cured. Mechanical properties of the cured objects were determined according to ISO 527-2. Residual styrene contents and residual benzaldehyde content were measured by gaschromatography using GC-FID (Gas Chromatography with a Flame Ionization Detector), using butylbenzene as an internal standard, after extraction of the cured objects in dichloromethane for 48 hrs.

TABLE 8

|  | 8a | 8b | 8c | 8d | Comp G |
|---|---|---|---|---|---|
| Triethanolamine | 0.3647 | | | | |
| Diethanolamine | | 0.2686 | | | |
| Potassium-2-ethylhexanoate K10% | | | 1.000 | | |
| N,N-Diethylacetoacetamide | 1 | 1 | 1 | 1 | |
| Coppernaphtenate Cu 8% | 0.27 | 0.27 | 0.27 | 0.27 | |
| p-tert-butylcatechol (ppm) | 200 | 200 | 419 | | |
| Cobalt-2-ethylhexanoate (Co 10%) | | | | | 1.5 |
| Butanox M-50 | 2 | 2 | 2 | 2 | 2 |
| Gel time (min) | 36 | 19 | 21.2 | 93.6 | 6.4 |
| Peak time (min) | 43.1 | 24.2 | 27 | 123 | 19.2 |
| Peakexotherm (° C.) | 115 | 116 | 110 | 90 | 136 |
| Barcol hardness casting 2 mm after 7 days Bottomside | 35 | 35 | 32 | 25 | 33 |
| Barcol hardness casting 2 mm after 7 days Topside | 44 | 45 | 42 | 35 | 38 |
| Barcol hardness casting 4 mm Post cured 16 hrs 40° C. | 45 | 44 | 45 | 42 | 45 |
| Rest styrene casting 4 mm post cured 16 hrs 40° C. (%) | 0.34 | 0.465 | 0.01 | 0.535 | 1.2 |
| Rest benzaldehyde casting 4 mm Post cured 16 hrs 40° C. (%) | 0.003 | 0.003 | <0.001 | 0.005 | 0.07 |

From the results above it is clear that with or without the addition of a base, being a potassium carbon/late or different amines, hard products can be obtained that contain a low amount of residual styrene and residual benzaldehyde. Next to this the accelerating effect of the addition of a base is clearly demonstrated.

Example 9

To 100 grams of Palatal P 4-01, amounts, relative to primary resin system, listed in table one were added. The reactivity was measured and 2 mm castings were made to measure Barcol hardness, tackiness and rest styrene and benzaldehyde. The 2 mm castings were cured in an open mould with the top side in contact with air.

From these results it is clear that various types of copper(II) salts as well as various types of potassium salts can be selected.

Example 10

The evaluation of the storage stability of the formulations according to the invention was performed based on 100 g Palatal P 4-01. The stability was tested in a test tube in an oil bath at 120° C. open to air and in a closed 100 ml jar in an oven at 80° C. The amounts below are in g.

TABLE 11

|  | 10a | 10b | Comp H | Comp I |
|---|---|---|---|---|
| Potassium-2-ethylhexanoate solution (K 10%) | 0.2913 | 0.9963 | | |
| Diethylacetoacetamide (%) | 0.3038 | 0.3250 | | |

TABLE 9

|  | 9a | 9b | 9c | 9d | 9e | 9f | 9g | 9h | 9i | 9j |
|---|---|---|---|---|---|---|---|---|---|---|
| Potassium-2-ethylhexanoate (%) | | 1.03 | 1.02 | 1.01 | | | | | | |
| Potassium acetate (%) | | | | | 1.03 | 1.00 | 1.01 | | | |
| Potassium hydroxide (%) | | | | | | | | 1.05 | 1.01 | 1.00 |
| N,N-Diethylacetoacetamide (%) | 1.02 | 1.02 | 1.02 | 1.02 | 1.02 | 1.02 | 1.01 | 1.01 | 1.01 | 1.02 |
| Copper(II)acetate (%) | | 1.10 | | | 1.08 | | | 1.06 | | |
| Copper(II)hydroxide (%) | | | 1.05 | | | 1.05 | | | 1.06 | |
| Copper(II)naphthenate (%) | 0.27 | | | 0.25 | | | 0.28 | | | 0.27 |
| Gel time (min) | 99.4 | 8.7 | 8.7 | 6.5 | 8.6 | 9.8 | 7.6 | 7.9 | 9.3 | 8.5 |
| Peak time (min) | 128 | 12.6 | 12.7 | 11.2 | 12.5 | 14.1 | 12.6 | 11.9 | 13.6 | 13.5 |
| Peak temperature (° C.) | 91 | 119 | 123 | 117 | 120 | 124 | 116 | 123 | 123 | 114 |
| Tackiness | none | none | none | none | none | none | none | none | none | none |
| Barcol bottom side | 25 | 40 | 37 | 37 | 42 | 38 | 40 | 40 | 33 | 50 |
| Barcol top side | 18 | 30 | 30 | 33 | 36 | 30 | 33 | 32 | 40 | 45 |
| Rest styrene (%) | 0.1 | 0.62 | 0.75 | 0.61 | 0.61 | 0.68 | 0.44 | 0.53 | 0.5 | 0.395 |
| Rest benzaldehyde (%) | <0.001 | <0.001 | <0.001 | <0.001 | <0.001 | <0.001 | <0.001 | <0.001 | <0.001 | <0.001 |

TABLE 11-continued

|  | 10a | 10b | Comp H | Comp I |
|---|---|---|---|---|
| Copper(II)naphthenate (Cu 8%) | 0.2675 | 0.2663 |  |  |
| Cobalt-2-ethylhexanoate (Co 10%) |  |  |  | 0.1525 |
| Stability at 120° C. (min.) | 330 | 305 | 315 | 213 |
| Stability at 80° C. (days) | 8-9 | 8-9 | 5 | 4 |

From these stability tests can be concluded that compared to both an unaccelerated resin as well as a cobalt pre-accelerated resin, the storage stability of the new accelerator is good at 120° C. and surprisingly even better at 80° C. This result also indicates that very good storage stabilities can be obtained for storage at ambient temperatures.

Example 11

To 100 grams of Palatal P 4-01 the ingredients of the accelerator system have been dosed in two different ways: in example A, all ingredients were mixed thoroughly and left to stand at 20° C. for 1 day before they were added to the resin. In example B the components were added separately to the resin just before the reactivity was measured.

TABLE 12

|  | Example | |
|---|---|---|
|  | 11A | 11B |
| Potassium-2-ethylhexanoate solution (K 10%) | 1.0388 | 1.0390 |
| N,N-Diethylacetoacetamide (%) | 1.0225 | 1.0228 |
| Copper(II)naphthenate solution (Cu 8%) | 0.2975 | 0.2978 |
| Dosing method | pre-mix | separate addition |
| Gel time (min.) | 6.0 | 5.7 |
| Peak time (min.) | 10.4 | 10.0 |
| Peak temperature (° C.) | 117 | 117 |

These experiments clearly demonstrate that the components of the cure system can be used as a pre-mixed accelerator solution which is added to the resin or can be dosed separately to the resin.

Examples 12a-12j

To 100 grams of Palatal P 4-01 was added 1.0 g diethylacetaceamide, 1.0 g K octanoate solution, 0.27 g Cu naphtenate solution and x mg of various inhibitors. After stirring for 10 minutes the mixtures were cure with 2 g Butanox M50. The resulting cure characteristics are listed below in table. The amounts below are in g.

TABLE 13

|  | Hydro-quinone | 2-methyl hydro-quinone | 2-tert-butylhydro-quinone | p-tert-butyl catechol | Gel time (min) | Peak time (min) | Exotherm ° C. |
|---|---|---|---|---|---|---|---|
| 12a | 31 |  |  |  | 15.5 | 21.3 | 111 |
| 12b |  | 31 |  |  | 14.9 | 20.5 | 111 |
| 12c |  |  | 30 |  | 15.6 | 21.0 | 112 |
| 12d |  |  |  | 0 | 5.1 | 9.3 | 116.2 |
| 12e |  |  |  | 2 | 5.0 | 9.2 | 116.9 |
| 12f |  |  |  | 8 | 6.3 | 10.8 | 116.1 |
| 12g |  |  |  | 16 | 8.7 | 13.5 | 114.8 |
| 12h |  |  |  | 32 | 14.9 | 20.3 | 112 |
| 12i |  |  |  | 64 | 35.9 | 42.8 | 106.6 |
| 12j |  |  |  | 110 | 134.8 | 140.4 | 94.7 |

These results clearly show that various inhibitors can be employed in the system according to the invention. In order to adjust the gel-time the amount can be varied, which is advantageous as various applications have various processing windows i.e. require different gel-times.

The invention claimed is:

1. A cured unsaturated polyester resin or vinyl ester resin composition, characterized in that wherein the unsaturated polyester resin or vinyl ester resin composition comprises an unsaturated polyester resin or vinyl ester resin and
   a) a copper compound,
   b) an acetoacetamide compound having the following formula:

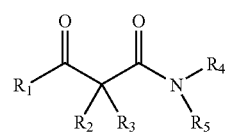

(1)

wherein,
   $R_1$, $R_2$, $R_3$, $R_4$ and $R_5$ each individually represents hydrogen (H), or a $C_1$-$C_{20}$ alkyl, $C_6$-$C_{20}$ aryl, alkylaryl or arylalkyl group, that each optionally may contain one or more hetero-atoms selected from the group consisting of oxygen, phosphor, nitrogen and or sulphur atoms; and/or substituents;
   a ring may be present between $R_1$ and $R_2$, $R_2$ and $R_3$, $R_3$ and $R_5$, and/or between $R_4$ and $R_5$;
   $R_4$ and/or $R_5$ may be part of a polymer chain or may be attached to a polymer chain; wherein the copper compound is present in an amount of at least 1 mmol per kg of primary resin system; and wherein
   the molar ratio between the copper compound and the acetoacetamide compound is from 10:1 to 1:500; and wherein
   the resin is cured with a peroxide and the resin composition contains less than 0.01 mmol cobalt per kg primary resin system and less than 0.01 mmol titanium per kg primary resin system, and wherein the resin composition also comprises a base which is either an organic base with pKa≥10 that is selected from amines, or an alkaline metal or earth alkaline metal compound, wherein the base is present in an amount of from 0.001 to 2000 mmol/kg of primary resin system.

2. The resin composition according to claim 1, wherein the copper compound in the resin composition is present in an amount of at least 100 ppm Cu.

3. The resin composition according to claim 1, wherein the copper compound is a copper carboxylate or a copper acetoacetate.

4. The resin composition according to claim 1, wherein $R_1$ is a $C_1$-$C_{20}$ alkyl group.

5. The resin composition according to claim 1, wherein at least one of $R_2$ and $R_3$ is hydrogen.

6. The resin composition according to claim 1, wherein at least one of $R_4$ and $R_5$ is hydrogen.

7. The resin composition according to claim 1, wherein $R_4$ and $R_5$ are hydrogen.

8. The resin composition according to claim 7, wherein the amount of the acetoacetamide compound is from 0.05 to 5% by weight, calculated on the total weight of the primary resin system.

9. The resin composition according to claim 1, wherein the alkaline metal or earth alkaline metal compound base is a potassium carboxylate.

10. The resin composition according to claim 1, wherein a molar ratio between the copper and a basic functionality of the base is from 40:1 to 1:200.

11. The resin composition according to claim 10, wherein a molar ratio between the acetoacetamide compound and a basic functionality of the base is from 400:1 to 1:40.

12. The resin composition according to claim 11, wherein the resin composition further comprises a radical inhibitor.

13. The resin composition according to claim 12, wherein the resin composition is free of cobalt.

14. The resin composition according to claim 13, wherein the resin composition is free of titanium.

15. Cured objects and structural parts which comprise the cured resin composition according to claim 1.

16. The resin composition according to claim 1, wherein the peroxide is at least one selected from the group consisting of hydroperoxides, perethers and perketones.

17. The resin composition according to claim 16, wherein the peroxide is methylethylketone peroxide.

18. The resin composition according to claim 17, wherein the amine base is a tertiary amine.

19. The resin composition according to claim 12, wherein the radical inhibitor is at least one selected from the group consisting of phenolic compounds, stable radicals, catechols and phenothiazines.

* * * * *